United States Patent
Seo

(10) Patent No.: US 8,021,264 B2
(45) Date of Patent: *Sep. 20, 2011

(54) GEAR TRAIN OF AUTOMATIC TRANSMISSION FOR VEHICLE

(75) Inventor: Kang Soo Seo, Suwon (KR)

(73) Assignee: Hyundai Motor Company, Seoul (KR)

( * ) Notice: Subject to any disclaimer, the term of this patent is extended or adjusted under 35 U.S.C. 154(b) by 381 days.

This patent is subject to a terminal disclaimer.

(21) Appl. No.: 12/260,731

(22) Filed: Oct. 29, 2008

(65) Prior Publication Data

US 2009/0233753 A1 Sep. 17, 2009

(30) Foreign Application Priority Data

Mar. 14, 2008 (KR) .......................... 10-2008-0023946

(51) Int. Cl.
*F16H 3/44* (2006.01)

(52) U.S. Cl. ........................................... 475/284

(58) Field of Classification Search .................. 475/180, 475/284, 281, 271, 275, 311, 276
See application file for complete search history.

(56) References Cited

U.S. PATENT DOCUMENTS

| | | | | |
|---|---|---|---|---|
| 6,887,178 B2 * | 5/2005 | Miyazaki et al. | ............. | 475/276 |
| 7,402,119 B2 * | 7/2008 | Kamada et al. | ................ | 475/282 |
| 7,488,269 B2 * | 2/2009 | Tabata et al. | .................. | 475/286 |

* cited by examiner

*Primary Examiner* — David D Le
*Assistant Examiner* — David J Hlavka
(74) *Attorney, Agent, or Firm* — Morgan, Lewis & Bockius LLP

(57) ABSTRACT

A gear train of an automatic transmission for a vehicle includes a first planetary gear set being a simple planetary gear set and a second planetary gear set that is formed of two combined simple planetary gear sets. The gear train combines four clutches and two brakes and realizes seven forward speeds. The gear train may enhance transmitting performance and reduce fuel consumption.

13 Claims, 5 Drawing Sheets

FIG. 2

|     | C1 | C2 | C3 | C4 | B1 | B2 | F |
|-----|----|----|----|----|----|----|---|
| D1  | ●  |    |    |    | ○  |    | ● |
| D2  | ●  |    |    |    |    | ●  |   |
| D3  | ●  | ●  |    |    |    |    |   |
| D4  | ●  |    |    | ●  |    |    |   |
| D5  | ●  |    | ●  |    |    |    |   |
| D6  |    | ●  | ●  |    |    |    |   |
| D7  |    |    | ●  |    |    | ●  |   |
| R1  |    | ●  |    |    | ●  |    |   |

GEAR TRAIN OF AUTOMATIC TRANSMISSION FOR VEHICLE

CROSS-REFERENCE TO RELATED APPLICATION

The present application claims priority to and the benefit of Korean Patent Application No. 10-2008-0023946, filed on Mar. 14, 2008, the entire contents of which are incorporated herein for all purposes by this reference.

BACKGROUND OF THE INVENTION

1. Field of the Invention

The present invention relates to a gear train of an automatic transmission for a vehicle that realizes a plurality of forward speeds, and in particular, seven forward speeds and reverse.

2. Description of Related Art

A conventional shift mechanism of an automatic transmission utilizes a combination of a plurality of planetary gear sets. A gear train of such an automatic transmission changes rotating speed and torque received from a torque converter of the automatic transmission and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a gear train such as durability, efficiency in power transmission, and size depend in part on the layout of combined planetary gear sets. Therefore, designs for a combining structure of a gear train are also under constant investigation.

A manual transmission that has too many speeds causes inconvenience of excessively frequent shifting operations to a driver. Therefore, the positive features of more shift-speeds are generally more important for automatic transmissions because an automatic transmission automatically controls shifting operations basically with reduced manual operation by a driver.

In addition to various developments regarding four and five speed gear trains, six-speed automatic transmissions have recently been developed.

The above information disclosed in this Background section is only for enhancement of understanding of the general background of the invention and therefore it may contain information that does not form the prior art that is already known in this country to a person of ordinary skill in the art.

BRIEF SUMMARY OF THE INVENTION

Various aspects of the present invention are directed to providing a gear train of an automatic transmission for a vehicle that realizes, meaning obtains or achieves, seven forward speeds. A gear train of an automatic transmission for a vehicle according to various aspects of the present invention includes a first planetary gear set being a simple planetary gear set provided with three rotational members, wherein a first rotational member is substantially always operated as a fixed member, a second rotational member forms a first intermediate output pathway where a reduced rotational speed is output, and a third rotational member forms an input pathway that is directly connected with an input shaft. A second planetary gear set may be combined with first and second simple planetary gear sets that have three rotational members respectively. The second planetary gear set may realize fourth, fifth, sixth, and seventh rotational members, wherein the fourth rotational member, which is realized with one rotational member, forms a first intermediate input path by being directly connected with the second rotational member, the fifth rotational member, which is realized with one rotational member, is operated as an output element by being connected with an output shaft, the sixth rotational member, which is realized with two rotational members directly connected with each other, forms a first variable input path by being variably connected with the input shaft, and is selectively operated as a fixed element by being connected with a transmission housing, the seventh rotational member, which is realized with two rotational members variably connected or separated from each other, forms a second intermediate input path by being variably connected with the second rotational member, forms a second variable input path by being variably connected with the input shaft, and is operated as a variable fixed element by being variably connected with the transmission housing. A plurality of friction members including clutches and brakes selectively connect the rotational members with one of the other rotational members, the transmission housing, or the input shaft.

The plurality of friction members may include a first clutch disposed for selectively integrally connecting the seventh rotational member; a second clutch disposed in the second intermediate input path; a third clutch disposed in the first variable input path; a fourth clutch disposed in the second variable input path; a one-way clutch and a first brake disposed in parallel between the sixth rotational member and the transmission housing; and a second brake disposed between the seventh rotational member and the transmission housing.

The first planetary gear set may be a single pinion planetary gear set, wherein the first rotational member is a first sun gear, the second rotational member is a first planet carrier, and the third second rotational member is a first ring gear; and the second planetary gear set may be a combination of a first simple planetary gear set, which is a single pinion planetary gear set, and a second simple planetary gear set, which is a double pinion planetary gear set, wherein the fourth rotational member is a third sun gear of the second simple planetary gear set, the fifth rotational member is a second ring gear of the first simple planetary gear set, the sixth rotational member is a second planet carrier of the first simple planetary gear set and a third ring gear of the second simple planetary gear set, and the seventh rotational member is a second sun gear of the first simple planetary gear set and a third planet carrier of the second simple planetary gear set.

The first clutch and the one-way clutch may be operated in the first forward speed. The first clutch and the second brake may be operated in the second forward speed. The first clutch and the second clutch may be operated in the third forward speed. The first clutch and the fourth clutch may be operated in the fourth forward speed. The first clutch and the third clutch may be operated in the fifth forward speed. The second clutch and the third clutch may be operated in the sixth forward speed. The third clutch and the second brake may be operated in the seventh forward speed. The second clutch and the first brake may be operated in a reverse speed.

The third clutch may be disposed between the third ring gear and the input shaft, and the first brake with the one-way clutch may be disposed between the second planet carrier and the transmission housing.

The first clutch may be disposed between the second sun gear and the third planet carrier, the second clutch may be disposed between the second rotational member and the second sun gear, and the second brake may be disposed between the second clutch and the second sun gear.

The first planetary gear set may be a double pinion planetary gear set, wherein the first rotational member is a first sun gear, the second rotational member is a first ring gear, and the third rotational member is a first planet carrier. The second planetary gear set may be a combination of a first simple planetary gear set, which is a single pinion planetary gear set, and a second simple planetary gear set, which is a double pinion planetary gear set. The fourth rotational member may be a third sun gear of the second simple planetary gear set, the fifth rotational member is a second ring gear of the first simple planetary gear set, the sixth rotational member is a second planet carrier of the first simple planetary gear set and a third ring gear of the second simple planetary gear set, and the seventh rotational member is a second sun gear of the first simple planetary gear set and a third planet carrier of the second simple planetary gear set.

The first clutch and the one-way clutch may be operated in the first forward speed. The first clutch and the second brake may be operated in the second forward speed. The first clutch and the second clutch may be operated in the third forward speed. The first clutch and the fourth clutch may be operated in the fourth forward speed. The first clutch and the third clutch may be operated in the fifth forward speed. The second clutch and the third clutch may be operated in the sixth forward speed. The third clutch and the second brake may be operated in the seventh forward speed. The second clutch and the first brake may be operated in a reverse speed.

The third clutch may be disposed between the third ring gear and the input shaft, and the first brake with the one-way clutch may be disposed between the second planet carrier and the transmission housing.

The first clutch may be disposed between the second sun gear and the third planet carrier. The second clutch may be disposed between the second rotational member and the second sun gear. The second brake may be disposed between the second clutch and the second sun gear.

In various embodiments of the present invention, a gear train of an automatic transmission for a vehicle includes a first planetary gear set being a single pinion planetary gear set and including a first sun gear, a first planet carrier, and a first ring gear; a second planetary gear set that is a combination of a first simple planetary gear set, being a single pinion planetary gear set and including a second sun gear, a second planet carrier, and a second ring gear, and a second simple planetary gear set, being a double pinion planetary gear set and including a third sun gear, a third planet carrier, and a third ring gear, wherein the first ring gear is directly connected with an input shaft, the first planet carrier is directly connected with the third sun gear, the second planet carrier is directly connected with the third ring gear, and the second ring gear is directly connected with an output shaft. A first clutch may be disposed between the second sun gear and the third planet carrier. A second clutch may be disposed between the first planet carrier and the second sun gear. A third clutch may be disposed between the input shaft and the third ring gear. A fourth clutch may be disposed between the input shaft and the third planet carrier. A one-way clutch and a first brake may be disposed in parallel between the second planet carrier and a transmission housing. A second brake may be disposed between the second sun gear and the transmission housing.

In various embodiments, a gear train of an automatic transmission for a vehicle may include a first planetary gear set being a double pinion planetary gear set and including a first sun gear, a first planet carrier, and first ring gear. A second planetary gear set may be a combination of a first simple planetary gear set, which is a single pinion planetary gear set including a second sun gear, a second planet carrier and a second ring gear, and a second planetary gear set, which is a double pinion planetary gear set including a third sun gear, a third planet carrier and a third ring gear. The first planet carrier may be directly connected with an input shaft. The first ring gear may be directly connected with the third sun gear. The second planet carrier may be directly connected with the third ring gear. The second ring gear, may be directly connected with an output shaft. A first clutch may be disposed between the second sun gear and the third planet carrier. A second clutch may be disposed between the first ring gear and the second sun gear. A third clutch may be disposed between the input shaft and the third ring gear. A fourth clutch may be disposed between the input shaft and the third planet carrier. A one-way clutch and a first brake may be disposed in parallel between the second planet carrier and a transmission housing. A second brake may be disposed between the second sun gear and the transmission housing.

The gear train according to various aspects of the present invention may be formed by combining two planetary gear sets, four clutches, and two brakes to realize seven forward speeds.

The frictional elements are decentralized so that a hydraulic line may be easily constructed, and only two frictional elements are operated in each shifting so that the volume of a hydraulic pump may be reduced and hydraulic pressure control efficiency may be enhanced.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart for the exemplary gear train illustrated in FIG. 1.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
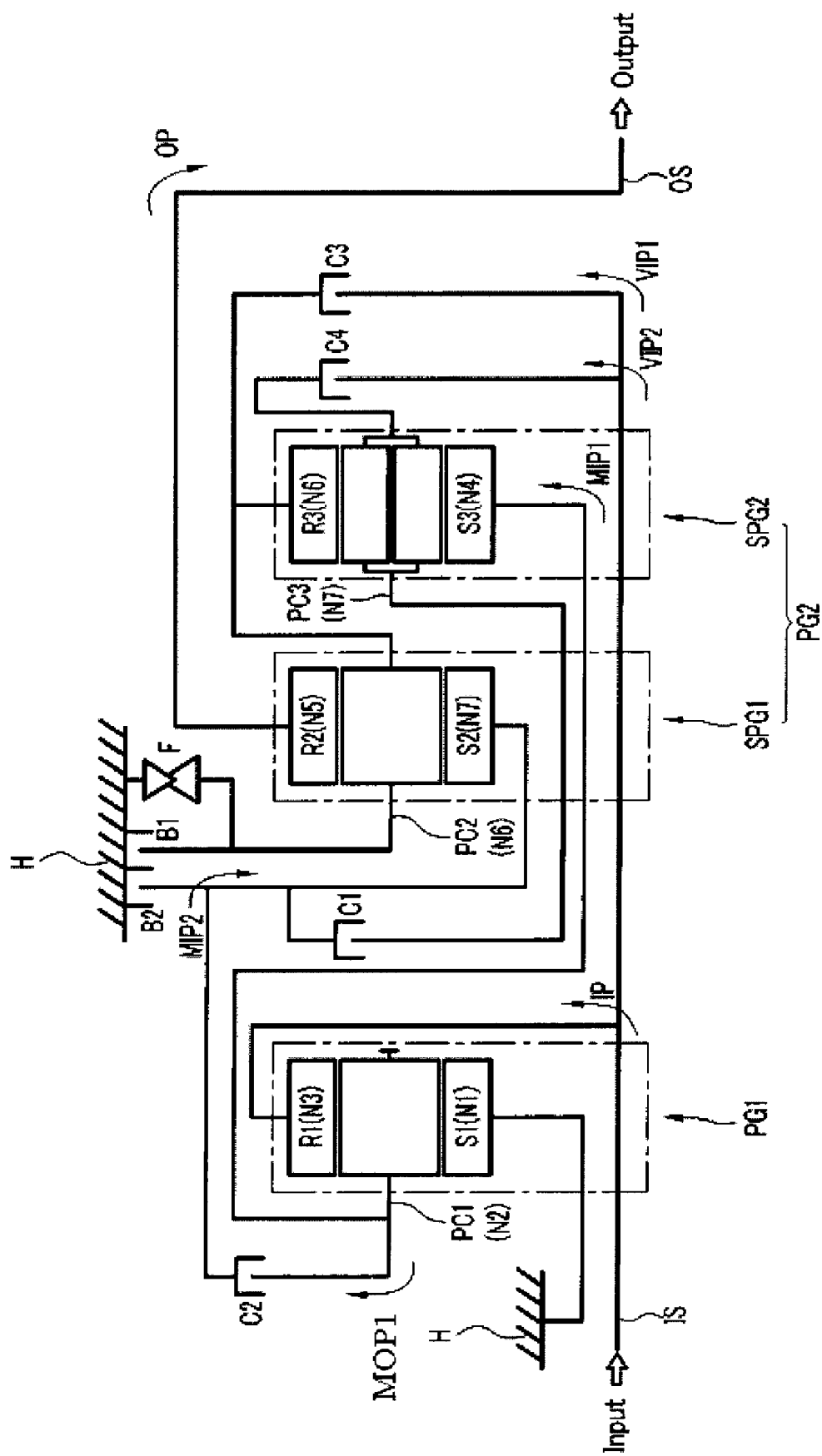
FIG. 1 is a schematic diagram of an exemplary gear train according to various aspects of the present invention.

FIG. 1 is a schematic diagram of a gear train according to various embodiments of the present invention. A gear train includes first and second planetary gear sets PG1 and PG2, four clutches C1, C2, C3, and C4, two brakes B1 and B2, and a one-way clutch F.

The first planetary gear set PG1 reduces a rotational speed of an input shaft IS and transmits a reduced speed to the second planetary gear set PG2. The second planetary gear set PG1 receives the reduced speed from the first planetary gear set PG1 and the rotational speed from the input shaft IS, selectively, and outputs seven forward speeds and one reverse speed through an output shaft OS.

For this purpose, the first planetary gear set PG1 is disposed close to an engine (not shown), and the second planetary gear set PG2 is sequentially disposed.

The input shaft IS is an input member and is a turbine shaft of a torque converter. Torque transmitted from a crankshaft of the engine is supplied to the input shaft IS through the torque converter. The output shaft OS is an output member and torque of the output shaft OS is transmitted to a differential apparatus through an output gear (not shown) and drives a driving wheel.

The first planetary gear set PG1 is a simple and single planetary gear set and includes a first rotational member N1 of a first sun gear S1, a second rotational member N2 of a first planet carrier PC1, and a third rotational member N3 of a first ring gear R1.

The first rotational member (N1; the first sun gear S1) is always operated as a fixed element by being directly connected with a transmission housing H.

The second rotational member (N2; the first planet carrier PC1) forms a first intermediate output path MOP1 where reduced rotational speed is output.

The third rotational member (N3; the first ring gear R1) is directly connected to the input shaft IS so as to form an input pathway IP.

The second planetary gear set PG2 is formed by combining first and second simple planetary gear sets SPG1 and SPG2 and includes fourth, fifth, sixth, and seventh rotational members N4, N5, N6, and N7. In various embodiments of the present invention, the first simple planetary gear set SPG1 is a single pinion planetary gear set and the second simple planetary gear set SPG2 is a double pinion planetary gear set.

The second carrier PC2 is directly connected with the third ring gear R3, and the second sun gear S2 and the third planet carrier PC3 are variably connected by the first clutch C1.

Thus, the fourth rotational member N4 is the third sun gear S3, the fifth rotational member N5 is the second ring gear R2, the sixth rotational member N6 is the second planet carrier PC2 and the third ring gear R3, and the seventh rotational member N7 is the second sun gear S2 and the third planet carrier PC3.

The fourth rotational member (N4; the third sun gear S3) is directly connected with the second rotational member N2 and forms a first intermediate input path MIP1 for receiving the reduced speed from the first planetary gear set PG1.

The fifth rotational member (N5; the second ring gear R2) is directly connected with the output shaft OS and forms an output path OP.

The sixth rotational member (N6; the second planet carrier PC2 and the third ring gear R3) is variably connected with the input shaft IS by the third clutch C3. The sixth rotational member forms a first variable input path VIP1. The sixth rotational member is also selectively operated as a input element. Further, the sixth rotational member N6 is variably connected with the transmission housing H by the first brake B1 and the one-way clutch F and is selectively operated as a fixed element.

The seventh rotational member (N7; the second sun gear S2 and the third planet carrier PC3) is variably connected with the first planetary gear set PG1 by interposing the second clutch C2 and forms a second intermediate input path MIP2.

Also, the seventh rotational member N7 is variably connected with the input shaft IS by clutch C4, forms a second variable input path VIP2, and is selectively operated as an input element. Further, the seventh rotational member N7 is variably connected with the transmission housing H by interposing the second brake B2 so as to be selectively operated as a fixed element.

The third clutch C3 of the sixth rotational member N6 is disposed between the third ring gear R3 and the input shaft IS, and the first brake B1 in parallel with the one way clutch F is disposed between the second planet carrier PC2 and the transmission housing H.

The first clutch C1 is disposed between the second sun gear S2 and the third planet carrier PC3, the second clutch C2 is disposed between the second rotational member N2 and the second sun gear S2, the fourth clutch C4 is disposed between the third planet carrier PC3 and the input shaft IS, and the second brake B2 is disposed between the second clutch C2 and the second sun gear S2.

The first, second, third, and fourth clutches C1, C2, C3, and C4 and the first and second brakes B1 and B2 may be enabled as a multi-plate hydraulic pressure friction device that is frictionally engaged by hydraulic pressure.

The first clutch C1 is disposed between the first and second planetary gear sets PG1 and PG2. The first and second brakes B1 and B2 and the one-way clutch F may be disposed outside of the first clutch C1.

The second clutch C2 is disposed in front of the first planetary gear set PG1, and the third and fourth clutches C3 and C4 are disposed behind the second planetary gear set PG2, so that a decentralized disposition may be achieved.

The decentralized disposition may maintain a stable mass center and allow hydraulic lines to be easily constructed for supplying hydraulic pressure to the friction members.

Figure 2:
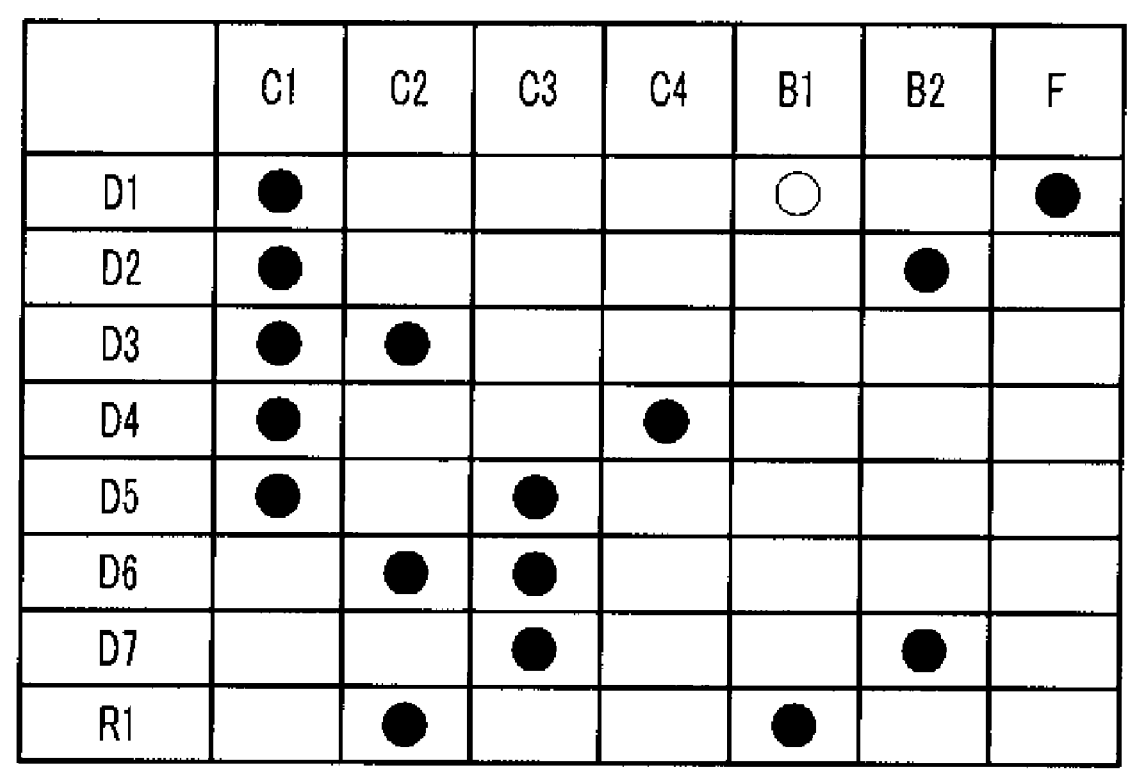

FIG. 2 is an operational chart for a gear train according to various embodiments of the present invention, and as shown in FIG. 2, the gear train illustrated in FIG. 1 may shift by operation of two friction members.

That is, the first clutch C1 and the one-way clutch F are operated in the first forward speed, the first clutch C1 and the second brake B2 are operated in the second forward speed, and the first clutch C1 and the second clutch C2 are operated in the third forward speed. The first clutch C1 and the fourth clutch C4 are operated in the fourth forward speed, the first clutch C1 and the third clutch C3 are operated in the fifth forward speed, and the second clutch C2 and the third clutch C3 are operated in the sixth forward speed. The third clutch C3 and the second brake B2 are operated in the seventh forward speed, and the second clutch C2 and the first brake B1 are operated in a reverse speed. One will appreciate from the foregoing that the clutch and gear combinations may be modified in accordance with the present invention to provide a plurality of forward speeds.

Figure 3:
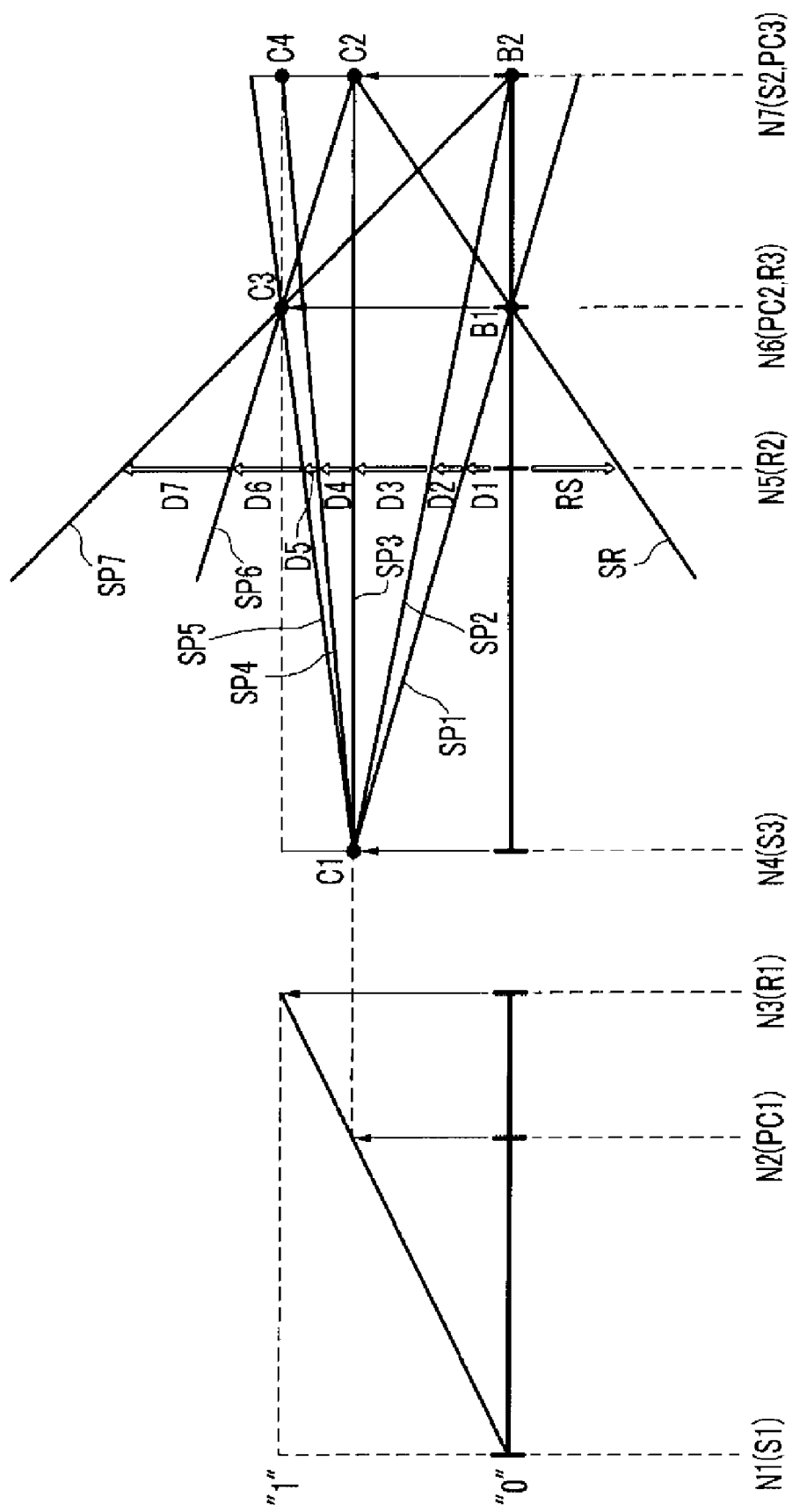
FIG. 3 is a lever diagram for the exemplary gear train illustrated in FIG. 1.

FIG. 3 is a lever diagram of a gear train according to various embodiments of the present invention. In FIG. 3, a lower horizontal line represents "0" rotational speed, and an upper horizontal line represents "1.0" rotational speed that is the same as the rotational speed of the input shaft IS.

Three vertical lines of the first planetary gear set PG1 respectively represent the first rotational member N1 (the first sun gear S1), the second rotational member N2 (the first planet carrier PC1), and the third rotational member N3 (the first ring gear R1) sequentially from the left in the drawing, and a distance between them is determined according to a gear ratio (teeth number of sun gear/teeth number of ring gear) of the first simple planetary gear set SPG1.

Four vertical lines of the second planetary gear set PG2 respectively represent the fourth rotational member N4 (the third sun gear S3), the fifth rotational member N5 (the second ring gear R2), the sixth rotational member N6 (the second planet carrier PC2 and the third ring gear R3), and the seventh rotational member N7 (the second sun gear S2 and the third planet carrier PC3) sequentially from the left in the drawing, and a distance between them is determined according to a gear ratio (teeth number of sun gear/teeth number of ring gear) of the first and second simple planetary gear sets SPG1 and SGP2. The lever diagram is well known to a person of ordinary skill in the art, and detailed descriptions will be accordingly omitted.

Hereinafter, shifting processes in the gear train according to an exemplary embodiment of the present invention will be described in detail.

First Forward Speed

As shown in FIG. 2, the first clutch C1 and the one-way clutch F are operated at the first forward speed D1.

In this case, as shown in FIG. 3, in a state that the input rotational speed is transmitted to the third rotational member N3 of the first planetary gear set PG1, the first rotational member N1 is operated as the fixed member. Thus, the reduced rotational speed is generated at the second rotational member N2.

The reduced rotational speed of the second rotational member N2 is transmitted to the fourth rotational member N4 that is directly connected with the second rotational member N2.

In a state in which the reduced rotational speed is transmitted to the fourth rotational member N4 of the second planetary gear set PG2, the sixth rotational member N6 is operated as the fixed member by operation of the one-way clutch F. Therefore, a first shift line SP1 connecting the fourth rotational member N4 with the sixth rotational member N6 is formed and the first forward speed D1 is output to the fifth rotational member N5, which is the output member.

Second Forward Speed

In a state of the first forward speed D1, the second brake B2 is operated to achieve the second forward speed D2.

In a state in which the reduced rotational speed is transmitted to the fourth rotational member N4 of the second planetary gear set PG2, the seventh rotational member N7 is operated as the fixed member by an operation of the second brake B2. Therefore, a second shift line SP2 connecting the fourth rotational member N4 and the seventh rotational member N7 is formed and the second forward speed D2 is output to the fifth rotational member N5, which is the output member.

Third Forward Speed

In a state of the second forward speed D2, the second brake B2 is released and the second clutch C2 is operated to achieve the third forward speed D3.

The reduced rotation speed of the second rotational member N2 is transmitted to the fourth rotational member N4 and to the seventh rotational member N7 by an operation of the second clutch C2 and the first clutch C1. Thus, the second planetary gear set PG2 becomes in a lock state and a third shift line SP3 connecting the fourth rotational member N4 and the seventh rotational member N7 is formed, and the third forward speed D3 is output to the fifth rotational member N5, which is the output member.

Fourth Forward Speed

In a state of the third forward speed D3, the second clutch C2 is released and the fourth clutch C4 is operated to achieve the fourth forward speed D4.

The reduced rotation speed of the second rotational member N2 is transmitted to the fourth rotational member N4, and the rotation of the input shaft IS is transmitted to the seventh rotational member N7 by an operation of the fourth clutch C4. Thus, a fourth shift line SP 4 connecting the fourth rotational member N4 and the seventh rotational member N7 is formed, and the fourth forward speed D4 is output to the fifth rotational member N5, which is the output member.

Fifth Forward Speed

In a state of the fourth forward speed D4, the fourth clutch C4 is released and the third clutch C3 is operated to achieve the fifth forward speed D5.

The reduced rotation speed of the second rotational member N2 is transmitted to the fourth rotational member N4, and the rotation of the input shaft IS is transmitted to the sixth rotational member N6 by an operation of the third clutch C3. Therefore, a fifth shift line SP5 connecting the fourth rotational member N4 and the sixth rotational member N6 is formed, and the fifth forward speed D5 is output to the fifth rotational member N5, which is the output member.

Sixth Forward Speed

In a state of the fifth forward speed D5, the first clutch C1 is released and the second clutch C2 is operated to achieve the sixth forward speed D6.

The reduced rotation speed of the second rotational member N2 is transmitted to the seventh rotational member N7 by an operation of the second clutch C2, and the rotation of the input shaft IS is transmitted to the sixth rotational member N6 by an operation of the third clutch C3. Thus, a sixth shift line SP6 connecting the sixth rotational member N6 and the seventh rotational member N7 is formed, and the sixth forward speed D6 is output to the fifth rotational member N5, which is the output member.

Seventh Forward Speed

In a state of the sixth forward speed D6, the second clutch C2 is released and the second brake B2 is operated to achieve the seventh forward speed D7.

The rotation of the input shaft IS is transmitted to the sixth rotational member N6 by the operation of third clutch C3, and the seventh rotational member N7 is operated as the fixed member by the operation of the second brake B2. Therefore, a seventh shift line SP7 connecting the sixth rotational member N6 and the seventh rotational member N7 is formed, and the seventh forward speed D7 is output to the fifth rotational member N5, which is the output member.

Reverse Speed

The first clutch C2 and the first brake B1 are operated in the reverse speed RS.

The rotation speed of the input shaft IS is transmitted to the third rotational member N3 of the first planetary gear set PG1, and the first rotational member N1 is operated as the fixed member. Thus, reduced rotation is output through the second rotational member N2.

The reduced rotation of the second rotational member N2 is transmitted to the seventh rotational member N7 by the operation of the second clutch C2 and the sixth rotational member N6 is operated as a fixed element by the operation of the first brake B1. Thus, a reverse shift line SR is formed, and the reverse speed RS is output to the fifth rotational member N5, which is the output member.

In the first forward speed, as shown in FIG. 3, in the state that the first clutch C1 is operated, the fourth rotational member N4 is operated as an input element and the sixth rotational member N6 is operated as a fixed element by the operation of the one-way clutch F, and thus, shifting is performed.

In a state of the first forward speed D1, the second brake B2 is operated so that the seventh rotational member N7 is operated as a fixed element, and thus, shifting is performed to achieve the second forward speed D2.

In a state of the second forward speed D2, the second brake B2 is released and the second clutch C2 is operated to achieve the third forward speed D3. Thus, the reduced rotation of the first planetary gear set PG1 is transmitted to the fourth rotational member N4 and the seventh rotational member N7, and thus, the second planetary gear set PG2 becomes or moves to the lock state.

In a state of the third forward speed D3, the second clutch C2 is released and the fourth clutch C4 is operated to achieve the fourth forward speed D4. Thus, different rotation speeds are transmitted to the fourth rotational member N4 and the seventh rotational member N7, and shifting is performed to achieve the fourth forward speed D4.

In a state of the fourth forward speed D4, the second clutch C2 is released and the third clutch C3 is operated to achieve the fifth forward speed D5. Thus, different rotation speeds are transmitted to the fourth rotational member N4 and the sixth rotational member N6, and shifting is performed to achieve the fifth forward speed D5.

In a state of the fifth forward speed D5, the first clutch C1 is released and the second clutch C2 is operated to achieve the sixth forward speed D6. Thus, a connection of the second sun gear S2 and the third planet carrier PC3 is released and different rotation speeds are transmitted to the sixth rotational member N6 and the seventh rotational member N7, and shifting is performed to achieve the sixth forward speed D6.

In a state of the sixth forward speed D6, the second clutch C2 is released and the second brake B2 is operated to achieve the seventh forward speed D7. Thus, the seventh rotational member N7 is operated as a fixed, or substantially fixed, element, and shifting is performed to achieve the seventh forward speed D7.

The second clutch C2 and the first brake B1 are operated in the reverse speed RS. A reduced rotation speed is transmitted to the seventh rotational member N7 and the sixth rotational member N6 is operated as a fixed element, and thus, shifting is performed to achieve the reverse speed.

When the first clutch C1 is released in the sixth and seventh forward speeds D6 and D7, and the reverse speed shifting are operated, a connection of the second sun gear S2 and the third planet carrier PC3 is released. Two rotational members receive rotation speed, and the second planetary gear set PG2 becomes or moves to the unlock state so that shifting is operated.

Figure 4:
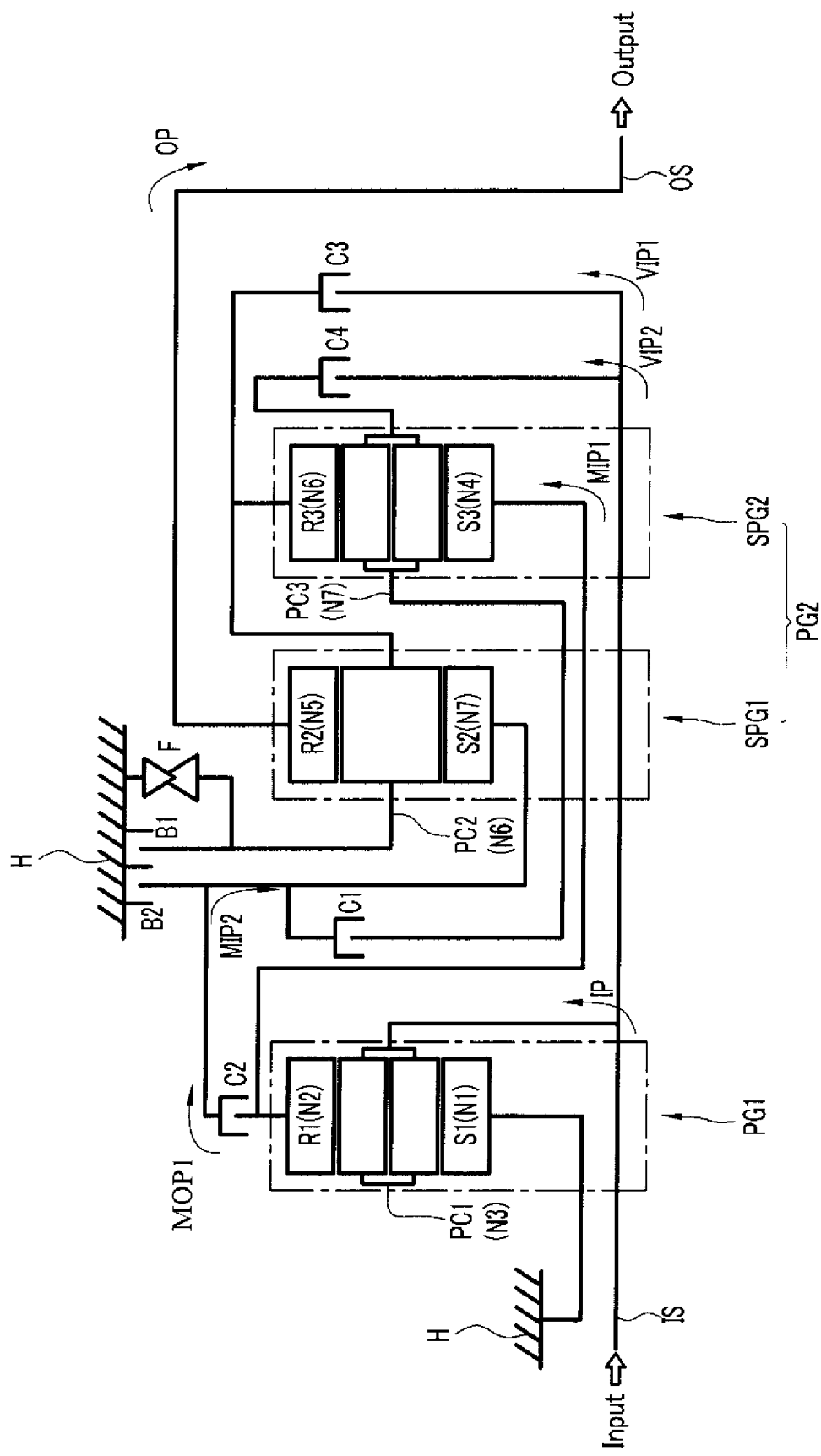
FIG. 4 is a schematic diagram of an exemplary gear train similar to the gear train of FIG. 1.
Figure 5:
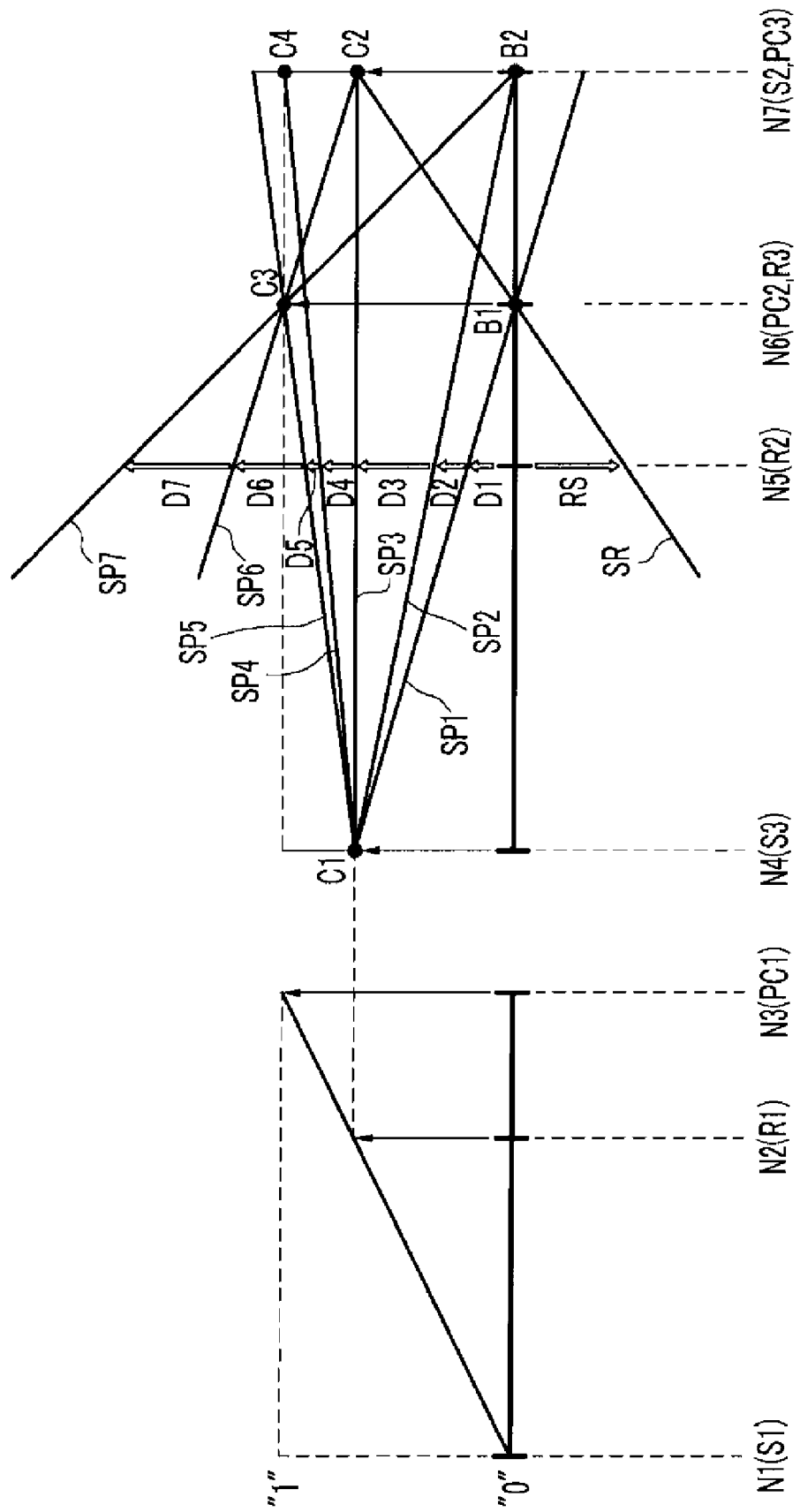
FIG. 5 is a lever diagram for the exemplary gear train illustrated in FIG. 4.

FIG. 4 is a schematic diagram of a gear train according to various embodiments of the present invention. A scheme of the second planetary gear set PG2 is the same as that of the above exemplary embodiments while a scheme of the first planetary gear set PG1 is different thereto.

That is, the first planetary gear set PG1 is a single pinion planetary gear set in the above exemplary embodiment of the present invention; however, the first planetary gear set PG1 is a double pinion planetary gear set in the present exemplary embodiments of the present invention.

The first rotational member N1 is the first sun gear S1, the second rotational member N2 is the first ring gear R1, and the third rotational member N3 is the first planet carrier PC1.

The second rotational member N2 of the first ring gear R1 forms a first intermediate output path MOP1, and the third rotational member N3 of the first planet carrier PC1 is operated as an input element.

Shifting of the gear train according to the exemplary embodiments of the present invention is the same as that of the above exemplary embodiments of the present invention.

That is, friction members are operated in each speed as shown in FIG. 2, and the shifting operations of the exemplary embodiment remain the same as those of the above embodiments except for the second and third rotational members N2 and N3, and are therefore not described in further detail.

For convenience in explanation and accurate definition in the appended claims, the terms "up" or "upper", "down" or "lower", "front" or "rear", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for a vehicle comprising:
   a first planetary gear set being a simple planetary gear set provided with three rotational members, wherein a first rotational member is always operated as a substantially fixed member, a second rotational member forms a first intermediate output pathway where a reduced rotational speed is output, and a third rotational member forms an input pathway that is directly connected with an input shaft;
   a second planetary gear set combined with first and second simple planetary gear sets that have three rotational members respectively, and the second planetary gear set realizes fourth, fifth, sixth, and seventh rotational members;
   wherein the fourth rotational member, which is realized with one rotational member, forms a first intermediate input path by being directly connected with the second rotational member;
   the fifth rotational member, which is realized with one rotational member, is operated as an output element by being connected with an output shaft;
   the sixth rotational member, which is realized with two rotational members directly connected with each other, forms a first variable input path by being variably connected with the input shaft, and is selectively operated as a fixed element by being connected with a transmission housing;
   the seventh rotational member, which is realized with two rotational members variably connected or separated from each other, forms a second intermediate input path by being variably connected with the second rotational member, forms a second variable input path by being variably connected with the input shaft, and is operated as a variable fixed element by being variably connected with the transmission housing; and
   a plurality of friction members comprising clutches and brakes that selectively connect the rotational members with one of the other rotational members, the transmission housing, or the input shaft;
   wherein the plurality of friction members comprises:
      a first clutch disposed for selectively integrally connecting the seventh rotational member;
      a second clutch disposed in the second intermediate input path;

a third clutch disposed in the first variable input path;
a fourth clutch disposed in the second variable input path;
a one-way clutch and a first brake disposed in parallel between the sixth rotational member and the transmission housing; and
a second brake disposed between the seventh rotational member and the transmission housing;
wherein:
the first planetary gear set is a single pinion planetary gear set, wherein the first rotational member is a first sun gear, the second rotational member is a first planet carrier, and the third second rotational member is a first ring gear; and
the second planetary gear set is a combination of the first simple planetary gear set, which is a single pinion planetary gear set, and the second simple planetary gear set, which is a double pinion planetary gear set; and
wherein the fourth rotational member is a third sun gear of the second simple planetary gear set, the fifth rotational member is a second ring gear of the first simple planetary gear set, the sixth rotational member is a second planet carrier of the first simple planetary gear set and a third ring gear of the second simple planetary gear set, and the seventh rotational member is a second sun gear of the first simple planetary gear set and a third planet carrier of the second simple planetary gear set.

2. The gear train of an automatic transmission for a vehicle of claim 1, wherein:
the first clutch and the one-way clutch are operated in the first forward speed;
the first clutch and the second brake are operated in the second forward speed;
the first clutch and the second clutch are operated in the third forward speed;
the first clutch and the fourth clutch are operated in the fourth forward speed;
the first clutch and the third clutch are operated in the fifth forward speed;
the second clutch and the third clutch are operated in the sixth forward speed;
the third clutch and the second brake are operated in the seventh forward speed; and
the second clutch and the first brake are operated in a reverse speed.

3. The gear train of an automatic transmission for a vehicle of claim 1, wherein the third clutch is disposed between the third ring gear and the input shaft, further wherein the first brake with the one-way clutch is disposed between the second planet carrier and the transmission housing.

4. The gear train of an automatic transmission for a vehicle of claim 1, wherein the first clutch is disposed between the second sun gear and the third planet carrier, the second clutch is disposed between the second rotational member and the second sun gear, and the second brake is disposed between the second clutch and the second sun gear.

5. A vehicle comprising a gear train system of the automatic transmission for the vehicle of claim 1.

6. A gear train of an automatic transmission for a vehicle comprising:
a first planetary gear set being a simple planetary gear set provided with three rotational members, wherein a first rotational member is always operated as a substantially fixed member, a second rotational member forms a first intermediate output pathway where a reduced rotational speed is output, and a third rotational member forms an input pathway that is directly connected with an input shaft;
a second planetary gear set combined with first and second simple planetary gear sets that have three rotational members respectively, and the second planetary gear set realizes fourth, fifth, sixth, and seventh rotational members;
wherein the fourth rotational member, which is realized with one rotational member, forms a first intermediate input path by being directly connected with the second rotational member;
the fifth rotational member, which is realized with one rotational member, is operated as an output element by being connected with an output shaft;
the sixth rotational member, which is realized with two rotational members directly connected with each other, forms a first variable input path by being variably connected with the input shaft, and is selectively operated as a fixed element by being connected with a transmission housing;
the seventh rotational member, which is realized with two rotational members variably connected or separated from each other, forms a second intermediate input path by being variably connected with the second rotational member, forms a second variable input path by being variably connected with the input shaft, and is operated as a variable fixed element by being variably connected with the transmission housing; and
a plurality of friction members comprising clutches and brakes that selectively connect the rotational members with one of the other rotational members, the transmission housing, or the input shaft;
wherein the plurality of friction members comprises:
a first clutch disposed for selectively integrally connecting the seventh rotational member;
a second clutch disposed in the second intermediate input path;
a third clutch disposed in the first variable input path;
a fourth clutch disposed in the second variable input path;
a one-way clutch and a first brake disposed in parallel between the sixth rotational member and the transmission housing; and
a second brake disposed between the seventh rotational member and the transmission housing;
wherein:
the first planetary gear set is a double pinion planetary gear set, wherein the first rotational member is a first sun gear, the second rotational member is a first ring gear, and the third rotational member is a first planet carrier; and
the second planetary gear set is a combination of the first simple planetary gear set, which is a single pinion planetary gear set, and the second simple planetary gear set, which is a double pinion planetary gear set; and
wherein the fourth rotational member is a third sun gear of the second simple planetary gear set, the fifth rotational member is a second ring gear of the first simple planetary gear set, the sixth rotational member is a second planet carrier of the first simple planetary gear set and a third ring gear of the second simple planetary gear set, and the seventh rotational member is a second sun gear of the first simple planetary gear set and a third planet carrier of the second simple planetary gear set.

7. The gear train of an automatic transmission for a vehicle of claim 6, wherein:
  the first clutch and the one-way clutch are operated in the first forward speed;
  the first clutch and the second brake are operated in the second forward speed;
  the first clutch and the second clutch are operated in the third forward speed;
  the first clutch and the fourth clutch are operated in the fourth forward speed;
  the first clutch and the third clutch are operated in the fifth forward speed;
  the second clutch and the third clutch are operated in the sixth forward speed;
  the third clutch and the second brake are operated in the seventh forward speed; and
  the second clutch and the first brake are operated in a reverse speed.

8. The gear train of an automatic transmission for a vehicle of claim 6, wherein the third clutch is disposed between the third ring gear and the input shaft, further wherein the first brake with the one-way clutch is disposed between the second planet carrier and the transmission housing.

9. The gear train of an automatic transmission for a vehicle of claim 6, wherein the first clutch is disposed between the second sun gear and the third planet carrier, the second clutch is disposed between the second rotational member and the second sun gear, and the second brake is disposed between the second clutch and the second sun gear.

10. A gear train of an automatic transmission for a vehicle comprising:
  a first planetary gear set being a single pinion planetary gear set and comprising a first sun gear, a first planet carrier, and a first ring gear;
  a second planetary gear set that is a combination of a first simple planetary gear set, being a single pinion planetary gear set and comprising a second sun gear, a second planet carrier, and a second ring gear, and a second simple planetary gear set, being a double pinion planetary gear set and comprising a third sun gear, a third planet carrier, and a third ring gear,
  wherein the first ring gear is directly connected with an input shaft, the first planet carrier is directly connected with the third sun gear, the second planet carrier is directly connected with the third ring gear, and the second ring gear is directly connected with an output shaft;
  a first clutch disposed between the second sun gear and the third planet carrier;
  a second clutch disposed between the first planet carrier and the second sun gear;
  a third clutch disposed between the input shaft and the third ring gear;
  a fourth clutch disposed between the input shaft and the third planet carrier;
  a one-way clutch and a first brake disposed in parallel between the second planet carrier and a transmission housing; and
  a second brake disposed between the second sun gear and the transmission housing.

11. A vehicle comprising a gear train system of the automatic transmission for the vehicle of claim 10.

12. A gear train of an automatic transmission for a vehicle comprising:
  a first planetary gear set being a double pinion planetary gear set and comprising a first sun gear, a first planet carrier, and first ring gear;
  a second planetary gear set that is a combination of a first simple planetary gear set, being a single pinion planetary gear set comprising a second sun gear, a second planet carrier and a second ring gear, and a second planetary gear set, being a double pinion planetary gear set comprising a third sun gear, a third planet carrier and a third ring gear,
  wherein the first planet carrier is directly connected with an input shaft, the first ring gear is directly connected with the third sun gear, the second planet carrier is directly connected with the third ring gear, and the second ring gear is directly connected with an output shaft;
  a first clutch disposed between the second sun gear and the third planet carrier;
  a second clutch disposed between the first ring gear and the second sun gear;
  a third clutch disposed between the input shaft and the third ring gear;
  a fourth clutch disposed between the input shaft and the third planet carrier;
  a one-way clutch and a first brake disposed in parallel between the second planet carrier and a transmission housing; and
  a second brake disposed between the second sun gear and the transmission housing.

13. A vehicle comprising a gear train system of the automatic transmission for the vehicle of claim 12.

\* \* \* \* \*